United States Patent
Dietzsch et al.

[15] 3,650,870
[45] Mar. 21, 1972

[54] PROCESS FOR THE CONTINUOUS MANUFACTURE OF CAPILLARY BLOCKS

[72] Inventors: Hans-Joachim Dietzsch, Villars sur Ollon Vaud; Otto Dietzsch, Stein am Rhine Schaffhausen, both of Switzerland

[73] Assignee: INVENTA AG fur Forschung und Patentverwertung, Zurich, Switzerland

[22] Filed: Sept. 3, 1969

[21] Appl. No.: 854,984

[30] Foreign Application Priority Data

Sept. 5, 1968 Switzerland.................................13371

[52] U.S. Cl..............................156/264, 156/306, 156/296, 156/181
[51] Int. Cl.....................................................B32b 31/30
[58] Field of Search................156/296, 264, 181, 500, 171, 156/272, 273

[56] References Cited

UNITED STATES PATENTS

| | | | |
|---|---|---|---|
| 2,200,269 | 5/1940 | Fischer | 156/264 |
| 2,514,197 | 7/1950 | Groten et al. | 156/273 |
| 2,778,763 | 1/1957 | Novak | 156/296 |
| 2,992,956 | 7/1961 | Bazinet | 156/296 |
| 3,018,882 | 1/1962 | Ferguson | 156/500 |
| 3,116,787 | 1/1964 | Campbell | 156/500 X |
| 3,222,149 | 12/1965 | Drummond | 156/296 X |
| 3,325,324 | 6/1967 | Schmidt et al. | 156/264 X |
| 3,449,187 | 6/1969 | Bobkowicz | 156/500 X |
| 3,477,889 | 11/1969 | Partensky | 156/264 X |
| 3,480,506 | 11/1969 | Hart | 156/272 X |

*Primary Examiner*—Benjamin A. Borchelt
*Assistant Examiner*—Daniel Bent
*Attorney*—Ernest F. Marmorek, Jordan B. Bierman and Marmorek & Bierman

[57] ABSTRACT

A process for the continuous production of block materials containing capillaries in side-by-side relationship comprising producing a plurality of capillary tubes having longitudinal axes adhering the tubes together to form a capillary web, drawing off said web, cutting said web transversely of said axes at predetermined intervals, to form relatively shallow web pieces having flat faces, placing said pieces with the faces in contact with one another affixing said pieces to one another to form a continuous block.

11 Claims, 8 Drawing Figures

INVENTORS
HANS JOACHIM DIETZSCH
OTTO DIETZSCH

Marmorek & Bierman, ATTORNEYS

PATENTED MAR 21 1972 3,650,870

INVENTORS
HANS JOACHIM DIETZSCH
OTTO DIETZSCH

Mannovik & Bierman, ATTORNEYS

PROCESS FOR THE CONTINUOUS MANUFACTURE OF CAPILLARY BLOCKS

The invention is concerned with the continuous production of blocks consisting of small hollow tubes or hollow filaments (hereinafter called capillaries) arranged side by side. Such blocks are used as light, anisotropic starting material for the production of sheet building materials or building boards and the like.

In practicing the present invention, a continuous layer of capillaries (hereinafter called the capillary web) is produced, which passes through a drawoff arrangement and, beyond this drawoff arrangement, is cut up transversely of the axes of the capillaries into strips which are thereafter arranged side by side parallel to one another to form a continuous block.

The term "capillary web" as used herein refers to a side-by-side arrangement of capillaries which are parallel to one another in one or more layers, such as are constituted by the textile threads unwound from a warp beam. In a preferred embodiment of the invention, the capillaries are produced from thermoplastic materials by melt-spinning. According to the invention, the capillary web is formed by means of an assembly of spinnerets and supplied directly and continuously to the drawoff arrangement. Accordingly, the number of spinnerets is equal to the number of capillaries forming the capillary web.

According to the invention the capillaries are produced from a melt of the thermoplastic material so that individual capillaries are spun by spinnerets which allow the material being spun to issue from an annular opening through the center of which flows a filling gas to form the hollow space of the capillary.

The individual capillaries in the capillary web, in the transverse capillary strips and also in the block formed therefrom need not be bonded together at their abutting outer surfaces. In a preferred form of the invention, however, the capillaries in the block have a mutual bond at their adjacent outer surfaces.

After the individual capillaries have issued from the spinnerets producing them, they are coated with a bonding agent before or after the drawoff arrangement which seizes and conveys them off from the spinneret. This coating may be effected, for example, by roller application or by spraying with a bonding agent from a spray device.

The spinnerets producing the individual capillaries may advantageously be arranged in known manner in a spinning block in a two-dimensional staggered system, so that the individual capillaries issuing from the spinning block as a strand will readily form the capillary web. In a particularly convenient form of the invention, the spinnerets are arranged in a straight row (or in a few straight rows), so that the individual capillaries issuing from this spinneret arrangement are already substantially in web form.

Moreover, the spinneret found particularly adapted to the present invention is characterized in that in an elongated block it has a second feed duct for the spinning melt and, located behind this feed duct in the spinning direction, a first feed duct extending parallel to the second duct and which is for the filling gas forming the capillary space. The two ducts are traversed at substantially right angles by a plurality of tubular spinneret bodies arranged in a row (or in a few rows) so that each tubular spinneret body extends through both feed ducts. The internal duct of each body is open to the first feed duct for the filling gas. The passage through which the tubular spinneret body extends from the first to the second feed duct is sealed, preferably by an annular packing which can be made tight by means of a screw thread arranged on the tubular spinneret body and with which a corresponding counter nut-thread in the spinning block is associated in the zone between the two feed ducts. If necessary, the seal can be improved additionally by the use of an O ring or a sealing compound, such as silicone rubber.

Furthermore, each tubular spinneret body projects into an associated bore in the spinning block in the zone where the capillary emerges. The bore in the spinning block is larger than the front portion of the tubular spinneret body introduced into it; more particularly, both are of cylindrical or conical form. The tubular body is centered in the bore so that the spinning gap for producing the capillary is formed between the internal face of the bore and the outer face of the front portion of the tubular spinneret body. This front portion is preferably reduced.

The centering of the body in the bore is improved by a spacing element located behind the bore and anchored in the block, against which element the body rests or in which it is guided and around which the spinning melt can flow. For example, this spacing element may be a perforated metal strip which, in addition to its perforations, has holes for the tubular spinneret bodies.

The elongated form of the spinning block, together with its elongated feed ducts, have an important advantage in that during operation, maximum precision of the dimensions of the spinning opening is obtained; that is, the adjustment of the inner spinneret tube with respect to the outer bore can be maintained very accurately. This also applies to the multistage spinnerets described hereinafter for producing capillaries the sheaths of which consist of more than one layer.

As materials for the capillaries there may be used thermoplastics such as polystyrene, polymethacrylates, polyamides, polyolefins, polyacetal resins, polycarbonates, polyvinyl chloride, etc.

The bonding agents which are optionally applied to the capillaries may be the residues of applied lacquers or solvent-containing adhesives, such as acetylcellulose; multi-constituent duroplasts such as epoxy resins; single-constituent or multi-constituent solvent-free bonding agents such as epoxy resins, polyester casting resins, varieties of silicone rubber, etc. If necessary, agents having an antistatic action may also be applied to avoid charging the capillaries electrostatically.

In the accompanying drawings, constituting a part hereof, and in which like reference characters indicate like parts, FIG. 1 is a schematic diagram of the process and apparatus of the present invention;

The foregoing drawings contain further features of the invention but are distorted in scale for ease of comprehension. For the same reason, the number of working parts is greatly reduced. In reality, several hundred or even thousands of capillaries are arranged side by side within a single capillary web.

Figures 1, 2:
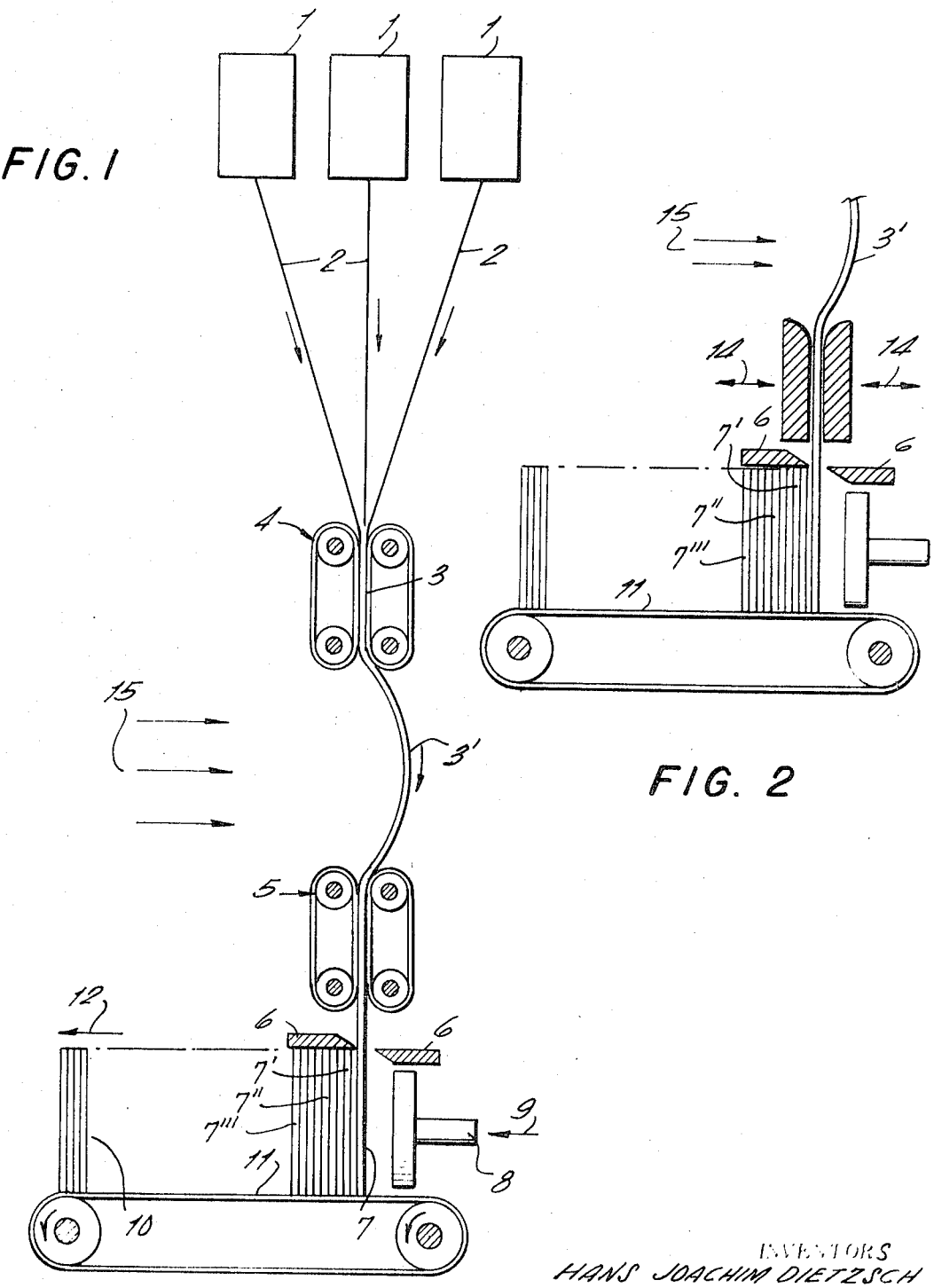
FIG. 2 is a partial schematic diagram showing a modification of FIG. 1.

Referring more specifically to FIG. 1, three spinning blocks 1 produce the three layers 2 of capillaries, which are combined and enter first drawoff means 4 as capillary web 3 and are carried along by drawoff means 4. In the zone of drawoff means 4, the spun capillaries are already substantially solidified by cooling. Capillary web 3 thereafter passes through second drawoff means 5. First means 4 preferably runs at constant speed, while second means 5 transports intermittently; that is, it moves periodically from standstill to a maximum speed and again to a standstill, so that the average conveying capacity is equal to the conveying capacity of the drawoff arrangement 4 running at constant speed. The two drawoff arrangements 4 and 5 are each shown as a pair of endless belts, each of which runs over two rolls. Of course, drawoff arrangements of a different form may also be employed, such as, for instance, a pair of rolls in each case. Due to the periodic conveying action of drawoff means 5, the capillary web 3 bellies out into the position 3' in the zone between the two drawoff arrangements 4 and 5. This bellying can be made to take place in a given direction by, for example, a stream of air 15 (See FIG. 1).

After drawoff means 5 cutting device 6 is located, which comes into action at the instant drawoff means 5 stops. Device 6 cuts off a transverse capillary strip 7 from capillary web 3 transversely of the axes of the capillaries. Ram 8 is thereafter set in motion in the direction of arrow 9 and forces the cutoff transverse capillary strip 7 against stack 10 of transverse capillary strips 7', 7'', 7''', etc. Stack 10 constitutes the block which is the end product of the present invention. In the course of production, stack 10 is slowly advanced by moving belt 11 in the direction of arrow 12. The block on belt 11 may run along lateral guides (not shown) and can undergo further processing if desired.

The apparatus of FIG. 2 is similar to that of FIG. 1 but which differs in that drawoff means 5 is replaced by an intermittently operating brake which clamps capillary web 3 at the instant the cutting operation of cutting device 6 takes place. Jaws 13 of the brake device move in the direction of arrows 14. Capillary web 3 bellies out into the position 3' during the braking action and pushes itself resiliently by means of its inherent elasticity through the subsequently re-opened jaws 13, to be again cut by device 6 and simultaneously clamped by jaws 13.

The cutting device can also operate on the capillary web 3 as it moves with the web. The cutting device performs an oscillating upward and downward movement and cuts on the down stroke. In this case, the mutual speeds of the capillary web and the cutting device can be so adjusted that there is virtually no bellying of the capillary web.

Cutting device 6 may be a pair of knives or an electrically heated cutting wire which fuses the ends of the capillaries to one another during the cutting operation and thereby holds the transverse capillary strip 7 together. Preferably, during the melting and cutting process, the area of the capillary zone to be cut is pressed together by means of clamping jaws above and below the actual cutting line until the capillary material softened by the cutting operation has cooled again.

Figure 3:
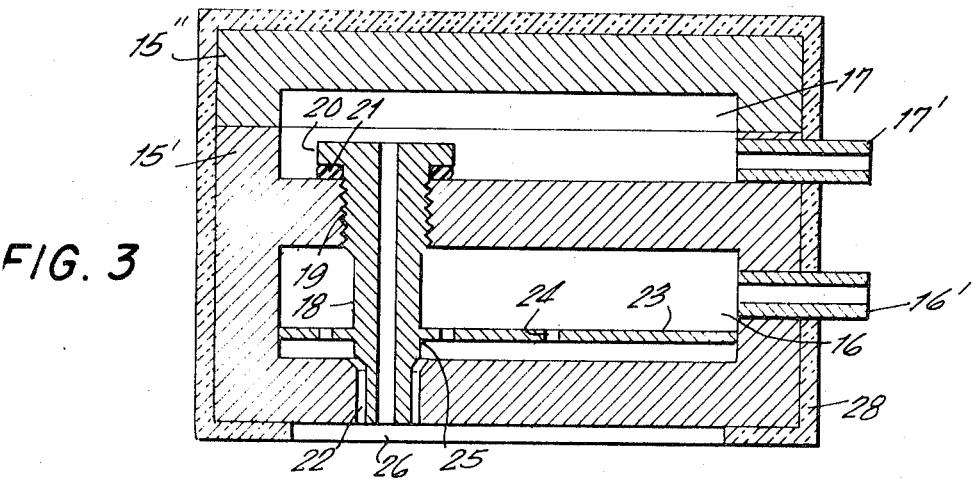
FIG. 3 is a longitudinal cross sectional view of a spinneret.
Figure 4:
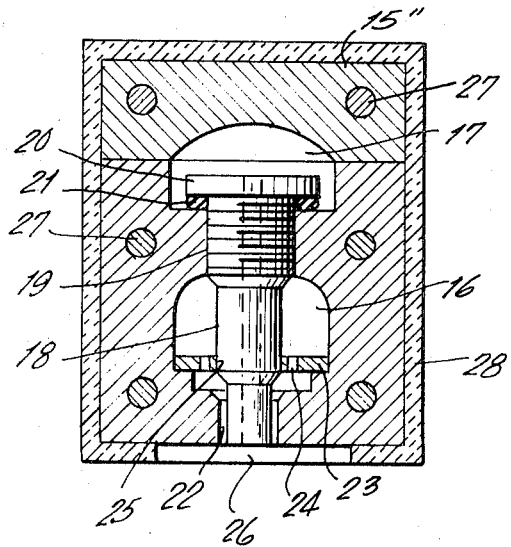
FIG. 4 is a transverse cross sectional view of a spinneret.

The spinning block shown in longitudinal and transverse cross section in FIGS. 3 and 4 comprises spinning block housing 15', 15'', which contains two feed chambers 16 and 17 for the spinning melt and the filling gas, respectively. Inlets 16' and 17' for spinning melt and filling gas are provided, and tubular spinneret bodies 18 each transverse ducts 16 and 17 and having a screw thread 19 and a flange 20, so that the packing 21 located between housing block 1 and flange 20 can be made tight. Bores 22 in block housing 1, into which the lower portion of tubular spinneret body 18 extends in a centered position are larger than body 18. Perforated strip 23 has a large number of flow passages 24 for the spinning melt and a through adjusting or registering hole 25 for each of tubular spinneret bodies 18 and is fixed to block housing 1. At the lower ends of bodies 18 are capillary outlets 26, from which the capillary tubes issue. Heating rods 27 are provided and the whole is covered with insulation 28.

Block housing 15' is divided in the area of feed duct 17 so that it consists of two parts 15' and 15'', which are tightly interconnectable by bolts or magnets (not shown). In this way, it is possible, even during operation, to eliminate any possible dirt or leaks at packing 21 by temporarily removing upper part 15'' and tightening body 18.

The longitudinal section of the spinning block according to FIG. 3 shows only one spinneret tube. As has already been said, in practice the number of these tubes is several hundred or even several thousand.

The cross section according to FIG. 4 also shows one spinneret tube. In practice, however, only one tube or a few tubes are actually arranged in this direction.

Figure 5:
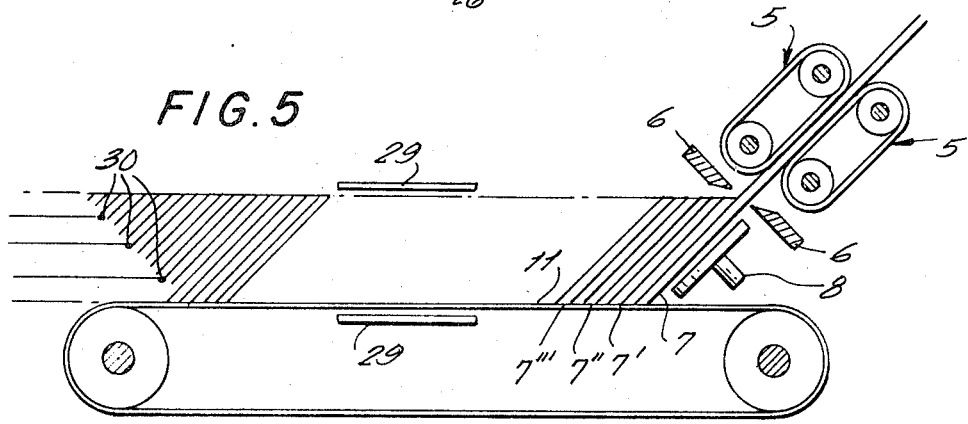
FIG. 5 is a schematic view of an alternate form of the invention.

The optional application of bonding agent may be effected by spraying or the like between the spinnerets and drawoff means 4, or between the two drawoff means 4 and 5 (or 4 and 13 in FIG. 2). In FIGS. 1 and 2, means 5 and 13, respectively, and transverse capillary strips 7 are at right angles to the belt 11. Of course, an inclined direction may also be chosen instead of this vertical direction. Such an inclined direction is shown in FIG. 5.

The strips may be fused by two condenser plates 29 which produce temporary dielectric loss heating of the capillary block by application of high-frequency alternating-current voltage. This causes welding or heat-sealing of the capillary pieces of the block lying one against the other (and pressed together by ram 8). Instead of dielectric loss heating, heating by infra-red radiation may be used. Wires 30 shown in section can be heated electrically and cut the capillary block up into thin sheets or into slices.

A particular feature of the invention provides that the capillaries of the continuously produced block are produced by melt spinning so that their walls consist of more than one layer. More particularly, these layers consist of different materials with different properties. As a result, two particularly advantageous methods of effecting the bonding of the capillaries are then obtained.

In the first method, the outermost layer of the capillary wall is produced from a material having a lower softening temperature than that of the inner layer. By the use of softening-temperature differential subsequent temporary softening in zone 29 of FIG. 5, heat sealing of the capillaries is effected without the form of the capillaries suffering, since the heat-sealing temperature is set only high enough for the outer layer to become adhesive while the inner layer of the capillary retains its stable form. The following may be mentioned as a suitable combination: the outer layer of the capillary wall is polyethylene and the inner layer is polypropylene.

In the second method, the outer layer of the capillary wall is formed from a hardenable viscous material (for example a silicone resin which is not cross-linked) which is caused to harden by addition of a hardening agent (such as a peroxide catalyst). This can be done by spraying the capillary web 3. This hardening process can then be completed on belt 11, if necessary with heating to obtain the mutual bonding of the capillaries. Here again, the outer layer of the capillary can be formed on the inner layer of the capillary wall by melt spinning. On the cooling of the wall of the capillary after it leaves the melt spinneret, then only the inner layers of the capillary wall need solidify; the outer layer which is still to be hardened can remain fluid.

The invention is also concerned with the apparatus for producing such multilayer capillaries. Such apparatus has one or more spinneret blocks each of which is preferably elongated and containing a plurality of elongated feed ducts disposed parallel to one another and which are traversed by a plurality of tubular spinneret bodies in such manner that, in each spinneret body a tube leads from each feed duct to the spinning orifice at the front, the rear or first tube extending through the forward or second feed chamber.

The tube starting from the rear or first feed chamber is open to the first chamber but sealed off from the others, whereas the other tubes merely extend through bores for which they are suitably designed with a sliding fit. It is the special intention of the invention that the pressure of the spinning melts contained in the feed ducts and conveyed through them be adjusted approximately to equal levels, so that no appreciable flow of spinning melt is brought about through the annular opening between the two adjacent feed ducts which exists as a result of the sliding fit of the tubes. The first feed duct is also supplied in this case with the capillary-forming filling gas under pressure.

All the tubular spinneret bodies terminate at the spinning orifice at the front at substantially the same level and they may have a tapered form in this zone. The tubular spinneret bodies may also have a flange at the rear end.

The definitions "front" and "rear" used herein are always meant in the sense of the direction of spinning of the capillaries.

If the spinnerets have more than one feed duct for liquid spinning materials, the tubes may be adjusted by spacing elements anchored in the spinning block by resting against these spacing elements or being guided in them. Additionally, such spacing elements may be arranged between the tubes located one inside the other.

Figure 6:
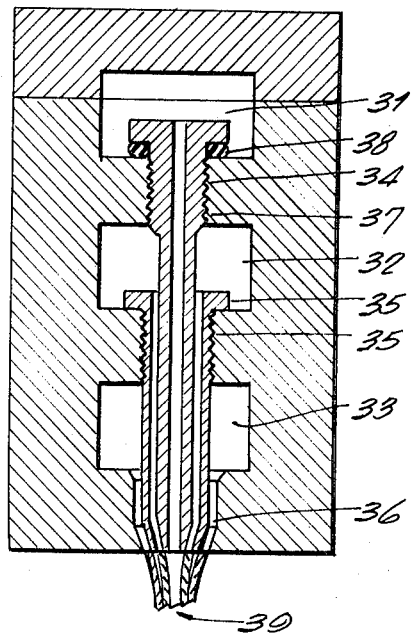
FIG. 6 is a cross section, similar to FIG. 5, of a spinneret for producing capillaries having multiple layer sheaths.

Such a spinneret intended for the production of a double shelled or two-layer capillary is shown in cross section in FIG. 6. Obviously, any number of layers can be produced by varying the number of ducts, etc., as those having reasonable skill in the art will appreciate.

The spinneret block includes first feed duct 31 for the filling gas, at which tubular spinneret body 34 starts. Body 34 keeps packing 38 compressed by tightening thread 37. Second feed duct 32 extends parallel to feed duct 31 and is filled with thermoplastic material and supplies this to the annular gap between tubes 34 and 35, which tapers towards the front (or downward as shown in FIG. 6). Tube 35 starts from feed duct 32, makes a sliding fit in the bore between the feed ducts 32 and 33 and has length-defining flange 35'. Third feed duct 33 is supplied with a second thermoplastic material and distributes this into the annular gap formed by tube 35 and bore 36. Capillary 39 that is produced is consequently two-layered.

Ram 8 (see FIG. 7) may be formed with a distributing chamber 8' into which gas under pressure, such as compressed air, can be introduced through the inlet 8''. The gas issues through a series of small holes 8'''. In this way, a dynamic pressure is exerted on the bundle or stack of transverse capillary strips 7', 7'', etc. even when ram 8 moves to the rear to make room for insertion of the next-following transverse capillary strip 7.

Figure 8:
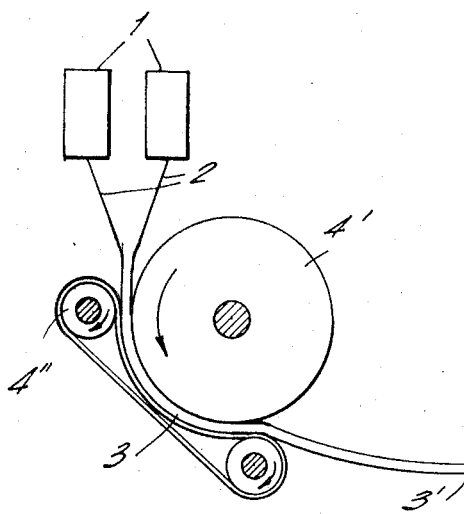
FIG. 8 is a schematic view, similar to FIG. 1, showing another embodiment of the invention.
Figure 8:
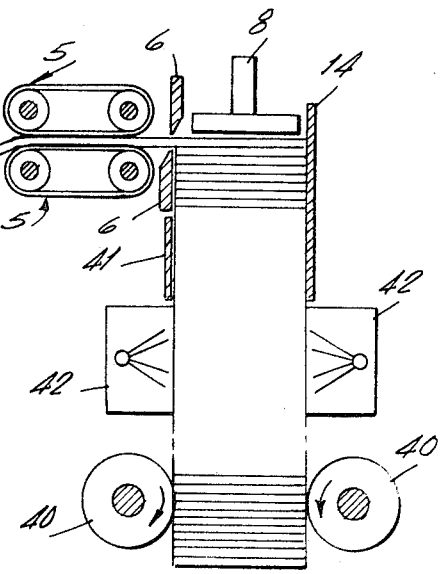

A further embodiment is shown in FIG. 8. In this case, the upper drawoff 4 consists of roll 4' and endless belt 4'', which rests against roll 4' and moves with it and runs over two or more rolls. Lower drawoff 5, which operates intermittently, is disposed horizontally, so that the arrangement of transverse capillary strips 7, 7', 7'', etc. in series is effected vertically.

Figure 7:
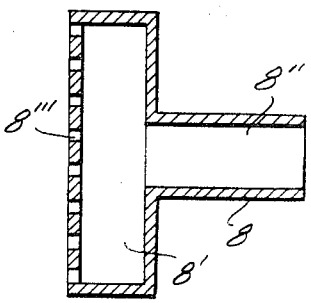
FIG. 7 is a detailed cross section of a ram used in the present invention.

A pair of rolls 40 conveys the capillary block vertically downwards. The force of gravity assists in this case in ensuring that the individual transverse capillary strips are placed one against the other. A gas under pressure and having a bundling or stacking action can flow out of ram 8, as shown in FIG. 7. In place of belt 11, vertical guide bars 41 are provided for guiding the transverse capillary strips. Heat chambers 42 with infra-red emitters are used in this case for temporarily heating the capillary block.

What is Claimed Is:

1. A process for the continuous production of blocks containing capillaries in side-by-side relationship comprising producing a plurality of capillary tubes having longitudinal axes, adhering said tubes together to form a capillary web, drawing off said web, cutting said web transversely of said axes at predetermined intervals and substantially simultaneously sealing the ends of said tubes, to form relatively shallow web pieces having flat faces, placing said pieces with said faces in contact with one another, affixing said pieces to one another to form a continuous block.

2. A process according to claim 1 wherein said capillaries are produced from thermoplastic material by melt spinning and are applied directly and continuously to means for drawing off said web.

3. A process according to claim 2 including issuing said material from an annular opening in a spinneret, causing a filling gas to issue from the center of said opening, whereby said capillary is formed.

4. A process according to claim 1 including drawing off said web by a first drawoff means which conveys said web substantially continuously, then passing said web through a second intermittent drawoff means before cutting.

5. A process according to claim 2 wherein said tubes are produced from spinnerets substantially arranged in the form of said web.

6. A process according to claim 1 wherein said adhering includes applying a bonding agent to the outside walls of said tubes.

7. A process according to claim 6 wherein said bonding agent is applied by spray or roller.

8. A process according to claim 6 wherein said bonding agent is applied by being formed simultaneously with said tubes as an outer layer thereof, said capillary tubes being produced from thermoplastic material by melt spinning, said material being fed into a first feed chamber of at least one spinneret and issuing from a first annular opening therein, said opening having a filling gas issuing from the center thereof, said bonding agent fed into a second feed chamber in said spinneret, a second annular opening in communication with said second chamber, said second opening surrounding said first opening, said agent issuing from said second opening and thereby coating said capillary tubes.

9. A process according to claim 1 including heating said pieces to effect bonding thereof.

10. A process according to claim 9 wherein said heating is by dielectric loss or infra-red radiation.

11. A process according to claim 1 wherein said sealing also fuses said tubes together.

* * * * *